United States Patent [19]

Sharp

[11] Patent Number: 4,859,262
[45] Date of Patent: Aug. 22, 1989

[54] METHOD OF MAKING STORAGE TANKS WITH SECONDARY CONTAINMENT

[76] Inventor: Bruce R. Sharp, 4090 Rose Hill, Cincinnati, Ohio 45229

[21] Appl. No.: 165,027

[22] Filed: Mar. 7, 1988

Related U.S. Application Data

[63] Continuation-in-part of Ser. No. 853,974, Apr. 21, 1986, which is a continuation-in-part of Ser. No. 824,680, Jan. 31, 1986, Pat. No. 4,653,312, which is a continuation-in-part of Ser. No. 745,540, Jun. 17, 1985, abandoned, which is a continuation-in-part of Ser. No. 740,869, Jun. 3, 1985, Pat. No. 4,607,522, which is a continuation-in-part of Ser. No. 544,013, Oct. 21, 1983, Pat. No. 4,523,454, which is a continuation-in-part of Ser. No. 544,012, Oct. 21, 1983, abandoned.

[51] Int. Cl.$^4$ .................... B32B 31/26; G01M 3/32
[52] U.S. Cl. .................... 156/155; 156/173; 156/175; 156/289; 73/49.2; 220/466; 220/469; 264/317
[58] Field of Search .............. 156/155, 173, 175, 185, 156/289; 264/317, 279.1; 220/466, 469, 5 R; 73/49.2

[56] References Cited

U.S. PATENT DOCUMENTS

| | | | |
|---|---|---|---|
| 3,210,228 | 10/1965 | Bluck | 156/173 |
| 3,266,660 | 8/1966 | Ragettli | 220/435 |
| 3,700,512 | 10/1972 | Pearson et al. | 156/62.4 |
| 4,501,292 | 12/1985 | Pugnale et al. | 73/49.2 |
| 4,523,454 | 6/1985 | Sharp | 73/49.2 |
| 4,535,518 | 8/1985 | Jaqua | 264/317 |
| 4,653,312 | 3/1987 | Sharp | 156/289 |

*Primary Examiner*—Robert A. Dawson
*Assistant Examiner*—Gregory J. Wilber
*Attorney, Agent, or Firm*—Charles R. Wilson

[57] ABSTRACT

A method of making a jacketed storage tank comprises applying a layer of wax over a rigid inner storage tank, applying fibrous reinforcing material and resinous material onto the wax, and then curing. The wax is subsequently melted and removed to create a continuous space. The resultant jacket is structurally independent from the storage tank, yet is in such close proximity thereto that the resultant jacketed storage tank has an integral structural strength capable of withstanding external load forces normally encountered by underground storage tanks. Secondary containment is provided by the jacket.

12 Claims, 2 Drawing Sheets

METHOD OF MAKING STORAGE TANKS WITH SECONDARY CONTAINMENT

This is a continuation-in-part of "Composite Storage Tanks With Secondary Containment", Ser. No. 06/853,974, filed Apr. 21, 1986, which is a continuation-in-part application of "Storage Tanks Having Formed Rigid Jacket for Secondary Containment," Ser. No. 06/824,680, filed Jan. 31, 1986, now U.S. Pat. No. 4,653,312 which is a continuation-in-part of "Fiberglass Reinforced Resin Storage Tanks Having Secondary Containment," Ser. No. 06/745,540, filed June 17, 1985, now abandoned and a continuation-in-part of "Storage Tanks Having Secondary Containment Means," Ser. No. 06/740,869, filed June 3, 1985, now U.S. Pat. No. 4,607,522, which is a continuation-in-part of "External Jacket System as Secondary Containment for Storage Tanks," Ser. No. 06/544,013, filed Oct. 21, 1983, now U.S. Pat. No. 4,523,454, and "Storage Tank Systems," filed Feb. 16, 1984, now U.S. Pat. No. 4,524,609, which is a continuation-in-part of Ser. No. 06,544,012, filed Oct. 21, 1983, now abandoned.

This invention relates to a method of making storage tanks. More particularly, the invention relates to a method of making underground storage tanks which have secondary containment means.

BACKGROUND OF THE INVENTION

Commercial and industrial storage tanks are widely used for storing a great variety of liquids. Some of these liquids are highly corrosive and/or are flammable. Recent proposed regulations will soon require most storage tanks to have secondary containment means and possibly a fail safe design feature to guard against accidental soil, water, and air contamination. Secondary containment means must be capable of containing leaked liquid from the storage tank. Rigid double walled tanks have been suggested as one alternative. While effective for containment purposes, such tanks, as presently available, are costly to build and difficult to install because of their weight. Such tanks are built by basically forming two rigid tanks utilizing different sized, reusable molds and then placing one tank inside the other.

Single and double walled tanks made from fiberglass reinforced resinous material are built using a number of distinct time consuming steps. In all known methods, a cylindrical-shaped, reusable mold is used to build tank halves which are subsequently assembled. Initially, layers of fiberglass followed by a resinous coating are applied to the mold or chopped fiberglass/resin streams are simultaneously directed onto the mold and subsequently cured. Sufficient applications of the fiberglass and resin are made until a wall thickness is obtained which has the desired strength. Next, support rib molds of cardboard, four to six inches wide, are placed completely around the cylinder at approximately sixteen inch intervals. Fiberglass and resin are then applied over the cardboard molds and onto adjacent areas of the cylinder so as to become an integral part of the inner tank shell. The mold is finally removed. The cylindrical-shaped wall, including the ribs and one end of the tank, are produced in this stage of the method. The above steps are repeated to obtain a second half-tank. The two half-tanks are then joined together by appropriate sealing means. The resultant single walled tank is capable of being installed in the ground and, in fact, is of the type which has been extensively used for the past twenty years.

In more recent years, double walled tanks have been built and used. Essentially, these tanks are built by the same method as the single walled tanks. An inner, rigid tank is formed in the above described manner. Next, a larger diameter reusable mold is used to build a horizontal half-tank. The fiberglass/resin is applied in a known manner to the mold and cured to form the half-tank. A second horizontal half-tank is formed. Next, the completed inner tank is placed into the larger diameter half-tank. The ribs on the inner tank are properly dimensioned to act as spacer ribs between the two tanks. The second larger diameter half-tank is placed over the inner tank, joined and sealed at the seams with its matching half-tank. The resultant product is a double walled storage tank system comprised of essentially two rigid tanks, one inside the other.

A second method of making double walled fiberglass reinforced resinous tanks is similar to the above method and is just as time consuming and costly. In this method, the mold has a design wherein the ribs are formed as the fiberglass and resin material is applied. The mold is removed after forming the inner tank of which the ribs are an integral part thereof. The interior portion of the tank next has a fiberglass/resin layer applied over the rib indentations to result in a smooth cylindrical-shaped interior. A second half-tank is formed in the same manner and the two halves joined. A cylindrical-shaped outer tank is then formed in horizontal halves. The formed inner tank and outer tank halves are assembled as in the first method described above to form a double walled storage tank system based on two rigid tanks with support ribs therebetween.

As is readily apparent, building a double walled storage tank system by known methods is very labor extensive and costly. Recent concerns about leaked tanks has heightened the need for an efficient and economical manner of building double walled storage tank system. Jacketed storage tank systems, as disclosed in my U.S. Pat. Nos. 4,523,454, 4,607,522, 4,653,312, 4,685,327 and b 4,696,186 provide secondary containment means and avoid the problems associated with the rigid double walled systems. Additionally, the aforementioned jacket systems feature a fail-safe design due to the fact they provide continuous monitoring means whereby the integrities of both the primary and secondary containment means are checked to insure that leakage of either containment means is known when it first occurs.

There has now been discovered methods whereby new and used storage tanks are provided with secondary containment means in a convenient, yet economical manner. Further, used storage tanks are refurbished to a standard equivalent to that possessed by a new tank and then upgraded to have a secondary containment feature.

SUMMARY OF THE INVENTION

A method of adding secondary containment capability to storage tanks comprises the steps of (a) applying a layer of wax to the outside surface of a rigid inner storage tank, (b) applying a layer of a fibrous reinforcing material onto the storage tank, (c) applying a resinous material onto or with the fibrous reinforcing material so that when cured a jacket is formed which is capable of containing any leaked liquid from the storage tank, (d) heating the jacketed rigid storage tank to melt the wax and (e) removing the melted wax to create a continuous closed space between the rigid inner storage tank and jacket whereby any leakage will accumulate and be readily detected. A containment means is formed which provides secondary containment for any liquid which may leak from the storage tank.

DETAILED DESCRIPTION OF THE INVENTION

While the description to follow describes the invention in terms of its use with underground storage tanks, it should be understood the invention has applicability for other uses as well. However, the invention lends itself particularly well to underground storage tanks used for storing liquid gasoline and, therefore, this preferred use is described in the following paragraphs.

Figure 1:
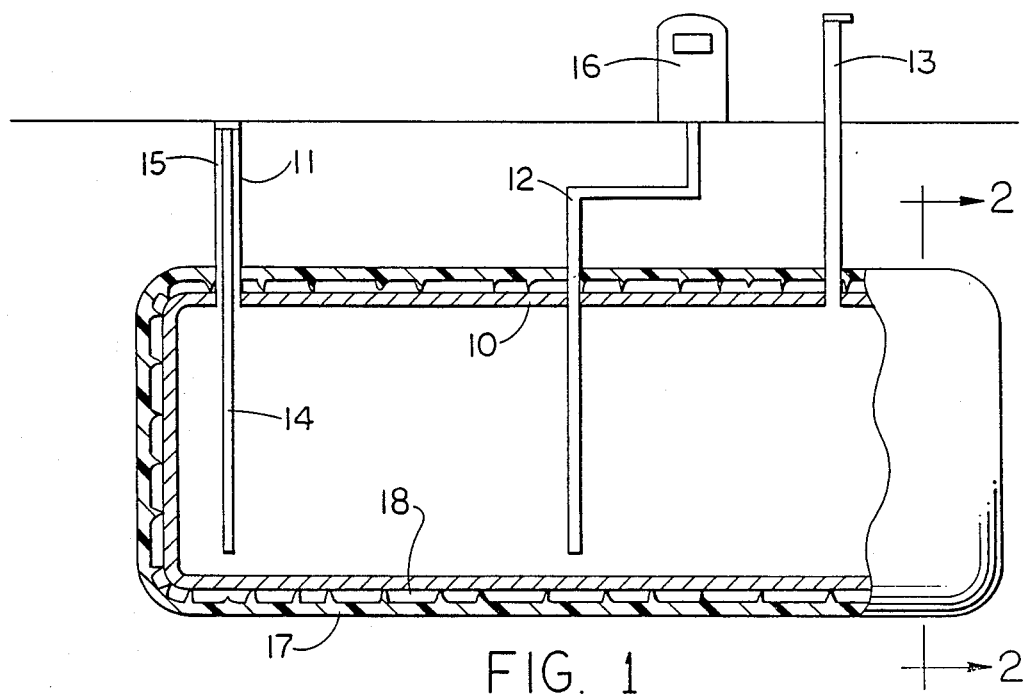
FIG. 1 is a side view in partial section of a storage tank having a fibrous reinforced resinous material as a jacket completely surrounding the tank.
Figure 2:
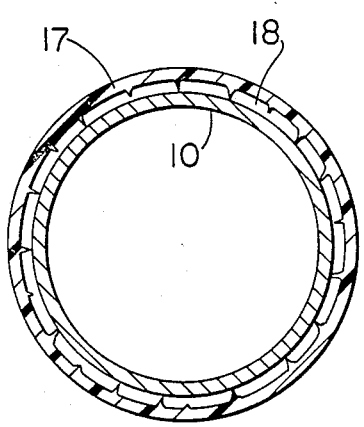
FIG. 2 is a end view of the storage tank of FIG. 1 taken along line 2—2.

Storage tanks are well known and are widely used, especially in the gasoline service station industry. They are typically made of metal or, more recently, a fiberglass reinforced resin material. Either type of tank has use in this invention. A typical metal underground storage tank 10 used in the method of this invention is shown in FIG. 1. Normally, the metal is from about 0.25 inches to about 0.75 inches thick, depending on the tank's size, and is capable of withstanding external load forces when buried underground. As better explained hereinafter, the wall thickness of the storage tank can be less than the about 0.25 inches, and preferably ranges from about 0.10 inches to about 0.25 inches. Sufficient openings are found in the storage tank 10 to allow for various access lines to communicate with the interior of the tank. As shown, lines 11, 12, and 13 are a fill pipe, dispensing line and vent pipe, respectively.

The fill pipe 11 provides as its obvious function the means by which gasoline can be pumped into the inner tank from an outside source, e.g. a tank truck. As illustrated in FIG. 1, fill pipe 11 comprises a line 14 through which gasoline flows to the inner tank 10 and a space 15 within the fill pipe which acts as a vapor recovery line. As gasoline is pumped into the inner tank, gasoline vapors which are formed are sucked through the space 15 back to the tank truck for recovery. This reduces the amount of gasoline vapors which would otherwise be vented to the atmosphere or remain in the inner tank preventing the tank from being filled completely with gasoline. As used throughout here, the term "fill pipe" connotes the pipe by which gasoline is pumped to the tank; it can be a single pipe, but more often has vapor recovery means associated with it and is often referred to as a vapor recovery fill line. As shown in FIG. 1, line 14 extends into the inner tank 10 with its end near the bottom.

Dispensing line 12 is used for withdrawing gasoline and delivering it to the consumer through gasoline dispenser 16. While not illustrated in FIG. 1, a pump is positioned within the inner tank, dispensing line or gasoline dispenser for pumping gasoline to the dispenser. The bottom of the dispensing line 12 is in close proximity with the bottom of the inner tank 10. The vent pipe 13 is optional, though preferred, and merely provides means by which gasoline vapors resulting primarily from a filling operation can be vented to the atmosphere. The opening to the atmosphere is normally substantially off ground level for safety reasons. All the aforementioned pipes and lines are securely attached to the rigid inner tank. Outer jacket 17 provides the secondary containment enjoyed by the tanks of this invention while closed space 18 provides a means by which leakage of the inner tank and jacket can be detected. Closed space 18 is a continuous area. As discussed below, the closed space initially is occupied by wax.

In making the storage tank of this invention, a layer of wax, from about 5 mils to about 2.0 inches in thickness and preferably from about 25 mils to about 250 mils thick, is initially applied to the rigid inner storage tank before the jacket is formed. A most preferred thickness of wax taking into consideration cost of wax, difficulty of applying, difficulty of removing and performance reasons is from about 60 mils to about 125 mils. Sufficient wax must be used on the rigid storage tank in this step to maintain a spaced relationship between the rigid storage tank and jacket, taking into account the fact the jacket could shrink about 2 % or more during cure. Accordingly, a layer of wax greater in thickness than a consequent formed jacket shrinkage is used. Too thick a coating is also avoided because of cost considerations involved with the wax itself and the heat needed to melt the wax and a resultant weakened tank system due to ground force deflections. The wax is applied by first melting it and then spraying it onto the tank.

The purpose of the wax is to ensure that a subsequently applied fibrous reinforcing material and resinous material which form the jacket will not adhere to the inner rigid storage tank. It is necessary that the cured jacket and the storage tank have a space between the two. Such space is closed and provides true secondary containment capability. Additionally, any sudden stress in the rigid storage tank or jacket which may cause a crack therein is less likely to be transmitted to the other because of the structural independence of the storage tank and jacket. Still another function of the closed space 18 is to provide a means by which the space therein can be monitored for possible tank or jacket leaks.

Figure 3:
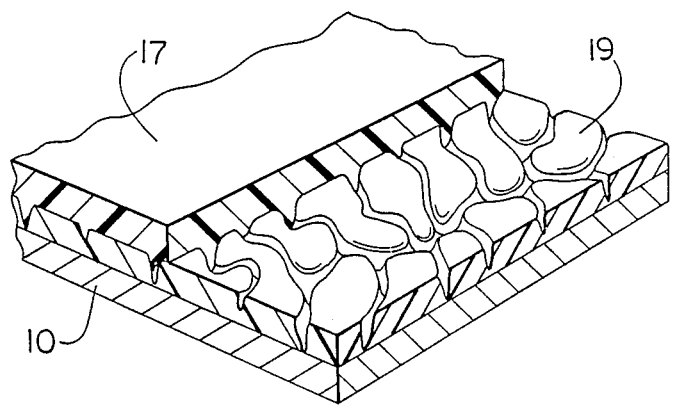
FIG. 3 is a partial sectional view in perspective of the storage tank of FIG. 1 with a layer of wax and jacket formed thereon.

Several waxes are used in this invention. All must have a melting point above room temperature, preferably above about 100° F. Examples include vegetable and mineral waxes such as caster wax, paraffin wax and petroleum waxes. As best seen in FIG. 3, the very nature of the wax when sprayed in a relatively thick coating will allow it to form an irregular surface with a random set of surface ridges 19. Such a surface is commonly referred to as an orange peel surface in the paint industry. An irregular surface is desired so that the subsequently formed jacket will have an irregular underside surface as better explained below. The irregular surface on the wax can also be obtained by mechanical means. Thus, a roller with a series of furrows or protrusions can be rolled over the wax to create grooves or indentations of various shapes.

Jacket 17, made of a fibrous reinforced resinous material, is formed over the wax layered rigid inner storage tank by first applying a layer of fibrous reinforcing inner material on the wax layer 19. The fibrous reinforcing material takes on many different physical shapes and structures variously referred to as mattings, nets, screens, meshes, and chopped strands. Examples of fibrous materials include fiberglass, nylon, and other synthetic fibrous materials. The fibrous material, if in a sheet form, is laid onto the storage tank as a continuous matting. Once the fibrous reinforcing material is applied, a resinous material is next applied to the reinforcing material and thereafter cured. Several different resinous materials are known for the purpose of reinforcing fibrous material. Such materials include polyesters, e.g. vinylesters, isophthalic polyesters, polyethylene, polypropylene, polyvinylchloride, polyurethane, and polyepoxide. The listed resinous materials used in the construction of this jacket are not all inclusive, but only illustrative of some of the resinous materials which can be used.

Alternatively, the fibrous material is applied in the form of chopped strands along with the resinous materials described in the previous paragraph. That is, the chopped strand and resinous material are sprayed from separate nozzles of the same spray gun and the jacket formed therefrom on the wax as the resin cures. Other known methods of forming a fibrous reinforced resin substrate can be used.

After the jacket 17 is formed, heat is applied to the jacketed storage tank to melt the wax. Heat guns are suitable for this purpose. Drain holes are strategically placed in the jacket to allow the melted wax to flow out. A sufficient amount of wax is removed in this manner so that a continuous space is formed between the inner storage tank and jacket. When the desired amount of wax has been removed, the drain holes are closed by application of resinous material, optionally additional fibrous material or any other patching technique. The shape of the resultant jacket is such that it encases the rigid inner storage tank, but is not a structural part of it. The jacket itself is capable of containing any liquid which is stored in the storage tank and which has leaked therefrom.

The strength of the jacketed storage tank has sufficient structural integrity to withstand external load forces normally encountered by underground storage tanks without suffering cracking or collapsing. As used herein, cracking is defined to means the jacket structurally tears apart to the extent a liquid will at least seep there through. Slight surface deformations can be tolerated; however, deflections of greater than about two inches from the norm would be considered a collapse. The strength of either jacket or storage tank is not important; rather it is the system's integral structural strength which is important. The integral structural strength results from the jacket's close proximity to the tank.

Figure 4:
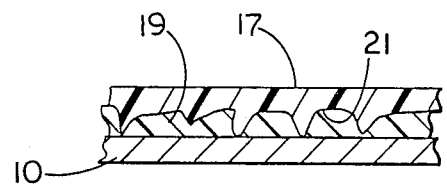
FIG. 4 is a partial side view of the storage tank of FIG. 1 prior to any wax removal.
Figure 5:
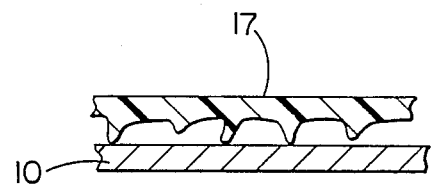
FIG. 5 is a partial side view of the storage tank of FIG. 4 after the wax has been melted and substantially removed.

As evident from FIGS. 4 and 5, the irregular underside of the jacket is such that protruding portions of it can make contact with the rigid inner storage tank. The raised protrusions 21 effectively act as force transfer supports. External forces normally experienced by buried storage tanks are transferred through the force transfer supports to the rigid inner storage tank. However, the continuous open nature around the force transfer supports of the space is maintained. The adequate strength combined with the light weight of the total system makes the system of this invention particularly attractive. Additionally, the secondary containment satisfies a demonstrated need.

Figure 6:
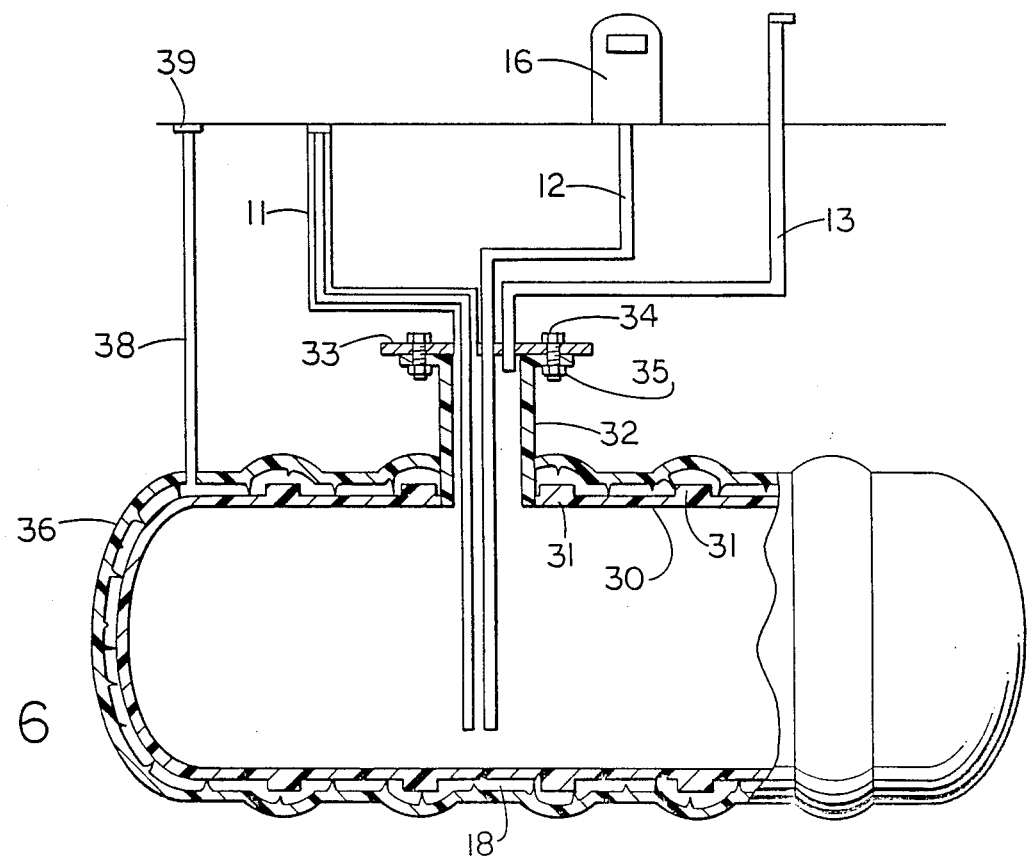
FIG. 6 is a side view of a typical fiberglass reinforced resinous storage tank having support ribs surrounding the tank and a jacket of a fibrous reinforced resinous material surrounding the storage tank.

FIG. 6 illustrates a typical fiberglass reinforced resinous storage tank 30. Such tanks are formed with supporting ribs 31 circumferentially surrounding the tank. A manway 32 allows for ready access to the tank's interior for repair or inspection work. The tank's interior is sealed by means of a cover 33 on the manway with bolts 34 and nuts 35. The ribs 31 act as supports so that the weight of the tank, including the contents therein are evenly distributed and add strength needed to withstand earth load stresses. This unique construction has necessitated special fabrications with prior art vaulted storage tanks based on two rigid shells. An advantage of this invention is that the fibrous reinforcing material can be laid over the wax covered ribs 31, and the resinous material applied without any special steps to accommodate the ribs 31. The subsequently formed jacket 36 which conforms substantially to the contour of the rigid tank is not only capable of holding any leaked liquid but also is capable of withstanding external load forces without breaking. The jacket's close proximity to the storage tank allows forces applied to the jacket to be transmitted to the storage tank. The steps of applying the fiberglass reinforcing material and the resinous material are the same as described above with respect to the metal storage tank of FIG. 1.

The space between the jacket and the storage tank can be monitored. As shown in FIG. 6, an access tube 38 extends from ground level through the jacket so as to be in communication with the closed space. Any of well known and commercially available monitor means can be used. For example, the closed space can be filled with a detecting liquid. This detecting liquid can be placed in the closed space by the manufacturer of the tank due to the fact the closed space between the storage tank and jacket occupies a small volume, e.g. about 25-100 gallons detecting liquid is sufficient for use with storage tanks having a capacity of from about 10,000 to about 20,000 gallons. At the end of the access tube is a sight glass 39. Whenever leakage occurs, a change in the level or color of a detecting liquid will occur and will be readily observed in the sight glass. Instead of the sight glass and visual observation of a change in level or color of detecting liquid, non-visual leak detection means such as pressure transducers or float controls can be used to detect a change in level.

Alternatively, the closed space can be placed either under a non-atmospheric pressure, i.e. a positive or negative air pressure. Detection means associated with the closed space is capable of detecting any change in pressure resulting from the leak in the jacket or the storage tank. A conventional air pump or vacuum pump, together with an associated pressure regulator is used. A pressure change sensor is a part of the detection means. A pressure gauge serves this purpose adequately. Optionally, an alarm system is electronically linked with the pressure sensor to audibly or visually warn of a pre-set significant pressure change. The protruding portions of the jacket's underside maintains a spaced relationship between the inner tank and the jacket when a vacuum is used.

Another embodiment of the detection means utilizes an analyzer capable of detecting the liquid being stored. Thus, the detection means comprises the analyzer which is in communication with the closed space. Preferably, a vacuum means for withdrawing gaseous material from the closed space is used for the purpose of obtaining a sample.

Still another detection means utilizes a probe which extends through an access tube so as to monitor for leakage, preferably at or near the bottom of the closed space. The probe is capable of detecting pre-selected liquids or gases.

The invention herein has been described with particular reference to the drawings. It should be understood other variations of the invention are within the scope of coverage.

What is claimed is:

1. A method of forming a storage tank system having secondary containment capability and sufficient integral structural strength to withstand external load forces, comprising the steps of:
   (a) applying a layer of wax over a rigid inner storage tank in a manner such that the outside surface of the wax has an uneven surface with a random set of surface ridges;
   (b) applying a fibrous reinforcing material and a resinous material onto said wax-covered rigid storage tank, so that when cured a jacket is formed which is capable of containing any leaked liquid from the inner tank, said jacket having an irregular underside with force transfer supports resulting from the resinous material occupying areas between the surface ridges;
   (c) heating the jacketed rigid storage tank of step (b) to melt the wax; and
   (d) removing a substantial amount of the wax thereby creating a continuous closed space between the rigid storage tank and the formed jacket, wherein the force transfer supports cause the jacket to contact the rigid storage tank in a random pattern such that external forces applied to the jacket are transferred through the supports to the rigid storage tank while maintaining the continuous closed space for detection of leakage through the storage tank or jacket.

2. The method of claim 1 wherein from about 5 mils to about 2.0 inches of wax is applied to the rigid storage tank.

3. The method of claim 2 wherein the uneven surface on the wax is formed by natural physical forces experienced by the wax as it cools.

4. The method of claim 2 further comprising mechanically creating an uneven surface in the wax.

5. The method of claim 1 wherein the storage tank is a metal tank having walls ranging in thickness of from about 0.10 inches to about 0.25 inches.

6. The method of claim 1 wherein the storage tank is of a fiberglass reinforced resinous material.

7. The method of claim 6 wherein the storage tank has support ribs surrounding its circumference so as to withstand external forces when buried underground.

8. The method of claim 4 wherein the jacket substantially conforms to the contour of the storage tank.

9. The method of claim 2 wherein the wax is applied at a thickness of from about 25 mils to about, 250 mils.

10. The method of claim 9 wherein the wax is applied at a thickness ranging from about 60 mils to about 125 mils.

11. The method of claim 10 wherein the wax is a paraffin wax having a melting point of above about 100° F.

12. The method of claim 1 wherein the fibrous reinforcing material is fiberglass.

* * * * *